UNITED STATES PATENT OFFICE.

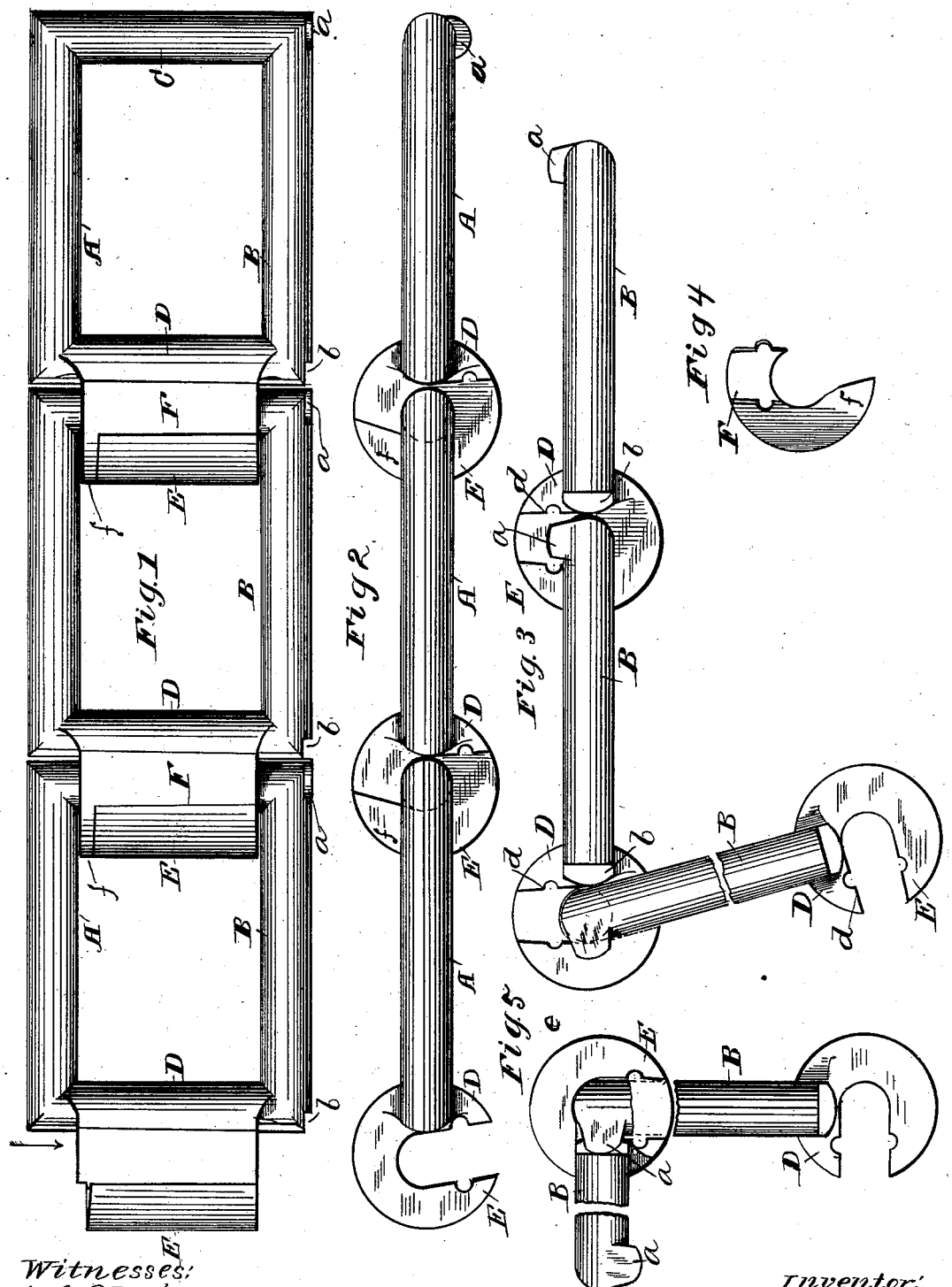

BENJAMIN A. LEGG, OF COLUMBUS, OHIO, ASSIGNOR TO THE JEFFREY MANUFACTURING COMPANY, OF SAME PLACE.

DRIVE-CHAIN.

SPECIFICATION forming part of Letters Patent No. 389,580, dated September 18, 1888.

Application filed March 29, 1888. Serial No. 268,880. (Model.)

*To all whom it may concern:*

Be it known that I, BENJAMIN A. LEGG, a citizen of the United States, residing at Columbus, in the county of Franklin and State of Ohio, have invented certain new and useful Improvements in Drive-Chains, of which the following is a specification, reference being had therein to the accompanying drawings.

Figure 1 is a top or plan view of my invention. Fig. 2 is an edge view looking in the direction of the arrow, Fig. 1. Fig. 3 is an edge view looking in the opposite direction, two of the links being at an angle to each other to permit the withdrawal of the key which prevents accidental uncoupling. Fig. 4 is a detached view of a key. Fig. 5 is a detached view representing two links in a position the reverse of that shown at the left-hand end of Fig. 3.

The invention relates to that class of drive-chains the links of which are coupled together by means of permanently-open coupler-hooks in which are mounted the end bars of adjacent links, and with which are combined keys fitted into the throats of the hooks to prevent accidental displacement of the end bars; and it consists of certain novel features of construction and combination of parts, which will be pointed out in the claims.

Like reference-letters indicate like parts in all the figures.

A B are the side bars. C is an end bar, all these bars being, by preference, round in cross-section.

D E is the hook, which is substantially like those of the ordinary detachable drive-chain, except that the upper end is provided with a dovetailed key-seat, $e$, and from the base of the hook there rises a lip or wing provided with a similar dovetailed groove, $d$, one end of the hook being recessed or cut away, as at $e'$, (see particularly Fig. 1,) to receive a lip or flange, to be described. The throat of the hook is wide enough to let the end bar, C, pass through sidewise; and to prevent accidental uncoupling I employ a dovetailed key, F $f$, of which the part F is preferably a little wider at the end from which the lip or flange $f$ projects than it is at its opposite end.

In order to couple two links to each other, I place them in the position indicated at the left-hand end of Fig. 3, with the end bar of one link in the hook of another, the first-mentioned link projecting downward from the second-mentioned one and in a direction opposite to the throat of said second one. When in such position, the key is thrust into the groove above referred to, with its lip or flange $f$ projecting downward against the side of the hook, which is preferably recessed or cut away, as indicated particularly in Fig. 1, at the left-hand end, so that when the links are straightened out into working position one side bar of the last coupled link of the series is moved in front of the lip and prevents the latter from being backed up out of the hook. Of course the key is held from endwise movement by reason of the flange being held between the hook of one link and the side bar of another link.

It will be seen that if the last assembled link be turned into a position substantially the reverse of that shown at the left-hand end of Fig. 3 (see Fig. 5) it could be moved sidewise and uncoupled by thrusting the key endwise out of its seat were it not for the presence of the lip $a$ on side bar B, which overlaps and engages with the slabbed-off part $b$ of the adjacent side bar B, (see also Fig. 5,) which engagement of parts prevents the movement of one link relatively to the other in one direction, while, of course, the opposite side bar, A, of the turned-up link is in front of that end of the key which has the flange projecting from it downward between the side bar A of the adjacent link and the hook of the turned-up link, so that no sidewise movement of the turned-up link in the opposite direction can take place. Thus this construction and combination of parts insures that no sidewise movement in either direction of one link relatively to the other can occur except when the links are in the position indicated in Fig. 5, and no endwise movement of the key can take place except when the links are in the position indicated in Fig. 3.

I am aware that chain-links have been made with dovetailed or recessed throats, in which keys were fitted to prevent uncoupling, the endwise movement of the keys being prevented by two lugs projecting upward from the adjacent side bars when the links are in a straight line, or thereabout; but my invention differs from such prior one in that, among other things, my lug a engages with the slabbed-off end of an adjacent side bar instead of the end of the key, endwise movement of which latter is prevented by the construction of parts at the opposite side of the link.

I am also aware that chains have been constructed in which the pintles are provided with lips or flanges which are locked from endwise movement by lugs or spurs formed upon the outer faces of the side bars, instead of passing down between the inner faces of the side bars and between the side bars and the adjacent faces of the hooks, as mine do.

As indicated in Fig. 1, (left-hand end,) the face of the hook is recessed to receive the flange f, so that the outer face of this flange shall be flush with the adjacent part of the hook to facilitate the swinging movements of the links about their articulations.

What I claim is—

1. In a drive-chain, the combination, with a link having an open hook and a link having its end bar seated in the open hook, of a key adapted to be thrust endwise into the throat of the hook, and provided with a flange projecting from the end and engaging with the side bar of the adjacent link to prevent withdrawal endwise of the key, substantially as set forth.

2. In a drive-chain, the combination, with the hook provided with a seat for the end bar and having one of its ends recessed, and the link having its end bar within the hook, of the key provided with a flange seated in the recess of the hook and between the end of the hook and the side bar of an adjacent link, substantially as set forth.

3. In a drive-chain, the combination, with the hook provided with a seat for the end bar and a link having its end bar seated in an open hook, of a key adapted to be thrust endwise into the throat of the hook, and provided with a flange projecting from one end and engaging with the side bar of an adjacent link, one link being provided with a lip, a, which engages with the adjacent link to prevent sidewise movement of one link relatively to the other, substantially as set forth.

In testimony whereof I affix my signature in presence of two witnesses.

BENJAMIN A. LEGG.

Witnesses:
T. P. LINN,
W. M. HACKETT.